United States Patent [19]
Torikai et al.

[11] Patent Number: 5,862,306
[45] Date of Patent: Jan. 19, 1999

[54] PRINTING APPARATUS HAVING A VIDEO DATA PROCESSOR AND PRINTING METHOD FOR USE WITH THE SAME

[75] Inventors: Kazuya Torikai; Koji Wada; Sumio Shibui, all of Tokyo, Japan

[73] Assignee: NEC Corporation, Tokyo, Japan

[21] Appl. No.: 966,668

[22] Filed: Nov. 1, 1997

Related U.S. Application Data

[63] Continuation of Ser. No. 359,872, Dec. 20, 1994, abandoned.

[30] Foreign Application Priority Data

Dec. 24, 1993 [JP] Japan .................................. 5-347901

[51] Int. Cl.[6] ...................................................... G06F 15/00
[52] U.S. Cl. ............................................................ 395/109
[58] Field of Search ..................................... 395/101, 102, 395/108, 109, 113, 947; 382/254, 255, 256, 258, 260, 263, 266, 269, 274; 345/426, 427, 428, 429, 432, 469; 358/518, 529, 532, 447, 448

[56] References Cited

U.S. PATENT DOCUMENTS

| | | | |
|---|---|---|---|
| 4,665,432 | 5/1987 | Shima ...................................... | 348/625 |
| 4,672,431 | 6/1987 | Cosgrove ................................ | 348/253 |
| 5,124,787 | 6/1992 | Lee et al. ................................ | 348/612 |
| 5,243,427 | 9/1993 | Yu ............................................ | 348/607 |
| 5,353,387 | 10/1994 | Petschik et al. ........................ | 395/109 |
| 5,379,049 | 1/1995 | Leach ....................................... | 345/22 |

FOREIGN PATENT DOCUMENTS

| | | |
|---|---|---|
| 331033 | 9/1989 | European Pat. Off. . |
| 513989 | 11/1992 | European Pat. Off. . |
| 625765 | 11/1994 | European Pat. Off. . |
| 2144574 | 6/1990 | Japan . |

OTHER PUBLICATIONS

*Patent Abstract of Japan*, vol. 10, No. 10 (M–446), Jan. 16, 1986 & JP–A–60 172 548 Sep. 6, 1985.

*Primary Examiner*—Scott Rogers
*Assistant Examiner*—Gabriel I. Garcia
*Attorney, Agent, or Firm*—Ostrolenk, Faber, Gerb & Soffen, LLP

[57] ABSTRACT

A video data processor disposed in addition to a printer controller includes a video data leading edge sensor for receiving a video signal of characters and objects and attaining therefrom a leading edge of video data, a contour display controller for generating data representing a contour on the basis of the leading edge data, a pattern display controller including pattern storage sections for keeping therein a plurality of display pattern data items and a pattern selector for selecting a predetermined display pattern item from the plural display pattern data items, and a logic circuit for producing a modulated video signal from data outputted from the contour display controller and data created from the pattern display controller and outputting the modulated video signal therefrom. Thanks to this configuration, consecutive dot data can be represented as a regular pattern. In a printing apparatus and a printing method, the quantity of toner consumption is efficiently decreased independently of resolution of the printing apparatus while keeping the image of original data unchanged.

6 Claims, 9 Drawing Sheets

PRINTING APPARATUS HAVING A VIDEO DATA PROCESSOR AND PRINTING METHOD FOR USE WITH THE SAME

This is a Continuation of application Ser. No. 08/359,872, filed on Dec. 20, 1994, now abandoned

BACKGROUND OF THE INVENTION

The present invention relates to a printing apparatus such as a laser printer and a printing method for use therewith, and in particular to a printing apparatus having a toner saving function and a printing method for use with the same.

DESCRIPTION OF THE RELATED ART

Heretofore, for reduction of toner consumed in a printer, there has been utilized a video data processing method in which dot data developed in an image buffer is processed as follows. For an objective dot b in the buffer, a dot a adjacent thereto is read from the buffer to compute a logical product between the data items a and b. In this procedure, the consecutive dot data items are thinned out such that every second data item is selected therefrom for the printing process. That is, it is possible to save the amount of toner corresponding to the skipped dot data items (as described, for example, in the Japanese Patent Laid-Open Publication No. Hei-2-144574).

In the conventional technology, however, for the reduction of toner consumption, the ratio of data items to be skipped to the original data items is limited and hence a sufficient reduction of toner is not attained in practices. Furthermore, in the method in which every other data items are thinned out for the printing process, there appear horizontal and/or vertical stripes due to influence of the skipped dot data items upon the original successive dot data items arranged in the image buffer. This leads to a problem of nonuniformity in the pattern repeatedly displayed. In addition, according to the printing apparatus of the prior art, since every second dot data item is skipped, the quantity of consumed toner varies depending on resolution of the printer.

There consequently arises a disadvantage that different results of printed images are obtained depending on the resolution.

SUMMARY OF THE INVENTION

It is therefore an object of the present invention to provide a printing apparatus and a printing method capable of effectively lowering the toner consumption without losing the picture of the original data and independently of resolution of the printer, thereby removing the problems of the prior art.

To achieve the object in accordance with the present invention, a video data processor is disposed in a printer controller. The video data processor includes a video data leading edge sensor for receiving a video signal of characters and objects and obtaining a leading edge of video data therefrom, a contour display controller for operating on the basis of the obtained leading edge data and thereby generating data representing a contour, and a pattern display controller including a pattern storage for keeping therein a plurality of display pattern data items externally supplied thereto and a pattern selector for selecting a predetermined display pattern from the storage.

There is also disposed a modulated video signal output section for operating on the basis of data produced from the contour display controller and data created from the pattern display controller and thereby generating a modulated video signal in a predetermined format.

In the configuration above, the video data change point sensor selects from a video signal sent from the video processor to produce a video change point sense signal indicating a point where print data is changed from white to black. The sense signal is transmitted to the contour display controller and the pattern display controller. The contour data generated from the contour display controller and the pattern data created from the pattern display controller are combined with each other by a logic circuit arranged in the video data processor. Resultantly, modulated signals are generated only for print data and are sent as video signals to a printer engine.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to FIGS. 1 to 8, description will be given of an embodiment of a printing apparatus in accordance with the present invention. Each of the embodiments respectively shown in FIGS. 1 and 8 includes a printer engine 2 for receiving information from a host computer printing out the information on a sheet of printing paper and a printer controller 1 for controlling operation of the printer engine 2.

Figure 1:
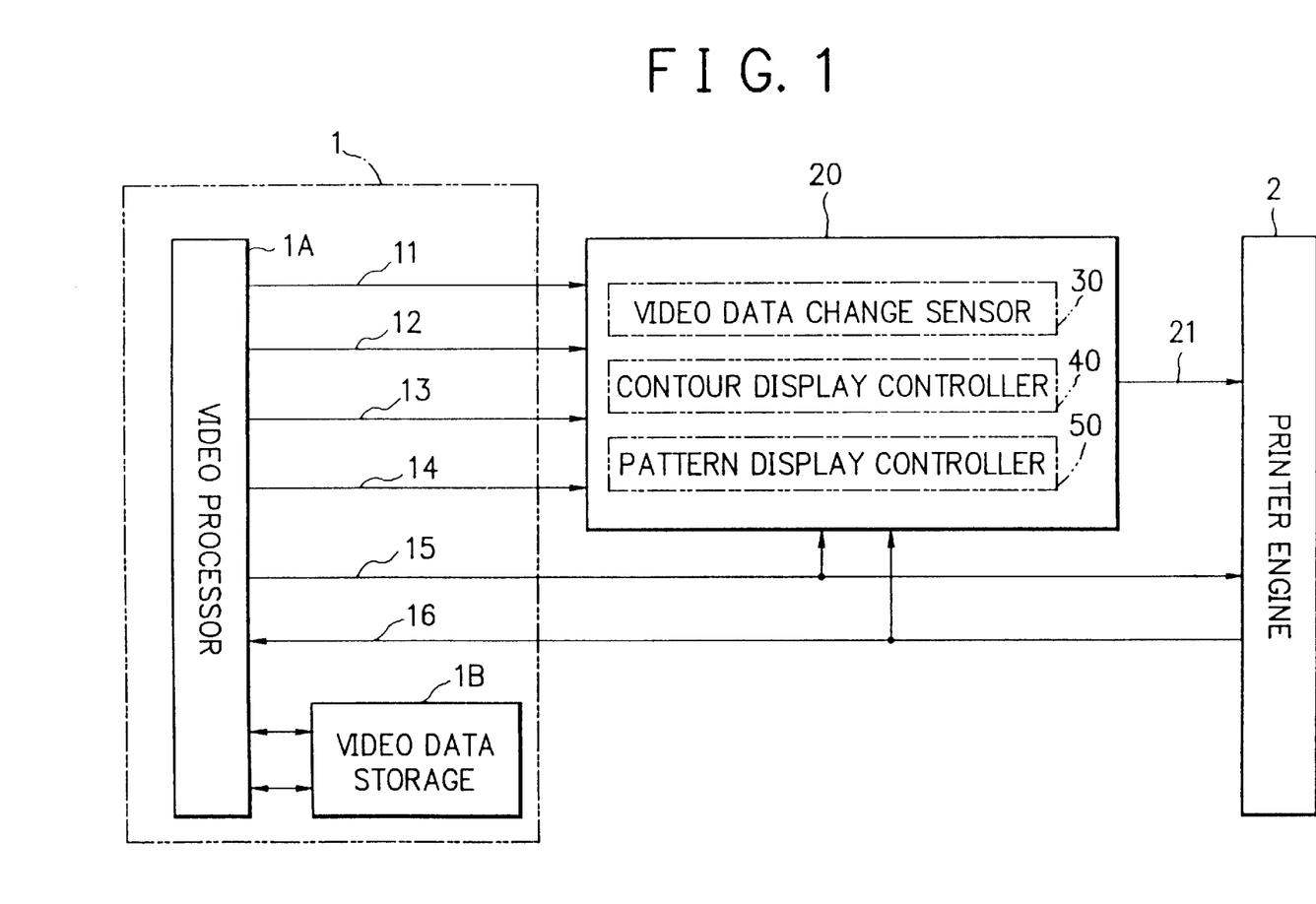
FIG. 1 is a schematic block diagram showing an embodiment of a printing apparatus in accordance with the present invention.

In FIG. 1, in addition to the printer controller 1, there is arranged a video data processor 20. The processor 20 includes a video data change point sensor 30 for sensing a change point of video data according to a video signal 13 received from the printer controller 1, a contour display controller for operating on the basis of the sensed data change point and thereby producing data representing a contour, and a pattern display controller 50 including pattern storage sections $51_1$ to $51_n$ for keeping therein a plurality of pattern data items received from an external device and a pattern selector 53 for selecting a predetermined display pattern from the pattern storage sections 51₁ to 51ₙ.

Figure 2:
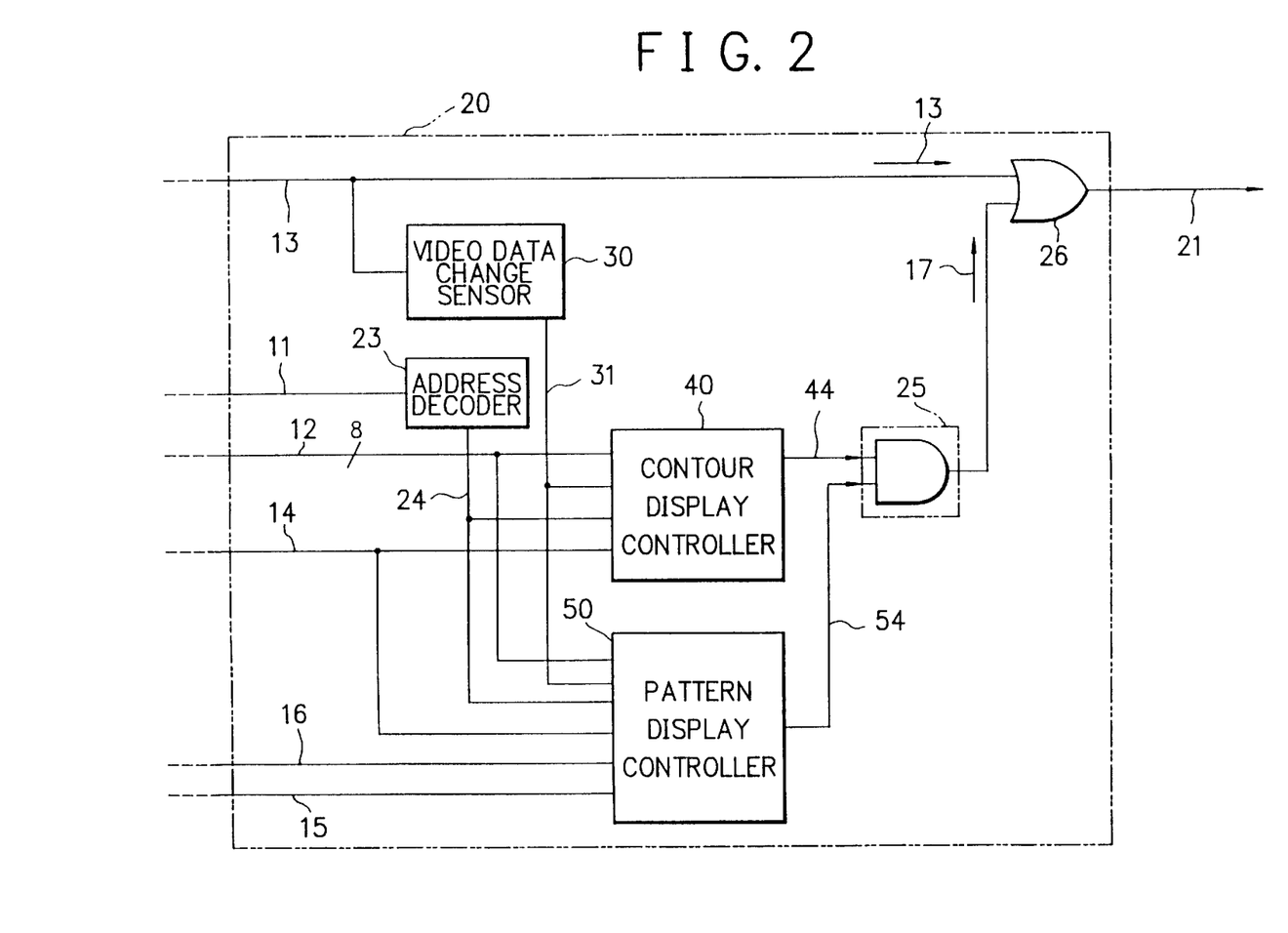
FIG. 2 is a block diagram showing an example of a video data processor constituting the embodiment of FIG. 1.

The video data processor 20 of FIG. 2 further includes a logic circuit 25 as a modulated video signal generator for operating on the basis of data created from the contour display controller 40 and data produced from the pattern display controller 50 for outputting therefrom a modulated video signal 17 in a predetermined format.

Specifically, the printer controller 1 includes a video processor 1A and a video data storage 1B. The processor 1A receives print data from a host computer to generate therefrom drawing data for each dot in conformity with resolution of the printer engine 2 so as to store the attained data in the storage 1B.

Between the video processor 1A and the video data processor 20, there are connected an address bus 11, a data bus 12, a video signal 13, and a video synchronizing (sync) signal 14. Transferred from the video data processor 20 to the printer engine 2 is a video signal 21.

From the video processor 1A, a vertical synchronizing (sync) signal 15 is fed to the video data processor 20 and the printer engine 2. On the other hand, a horizontal synchronizing signal 16 is delivered from the printer engine 2 to the video processor 1A and the video data processor 20.

Video data which is generated by the video processor 1A and which is then stored in the video data storage 1B is transformed into a video signal 13 in association with the horizontal synchronizing signal 16 from the printer engine 2 and the video synchronizing signal 14. The video signal 13 is sent to the video data processor 20.

The video data processor 20 conducts a video data processing for the video signal 13 from the video processor 1A to produce a video signal 21 to be fed to the printer engine 2. The contents of the processing of the video data processor 20 will now be described by reference to FIGS. 1 to 3.

The video data processor 20 includes as described above the video data change point sensor 30, the contour display controller 40, and the pattern display controller 50. Transmitted to the controllers 40 and 50 is a select signal 24 created by an address decoder 23 according to information on the data bus 12 for the data write operation and the address bus 11 specifying an internal storage address.

Receiving the video signal 13 from the video processor 1A, the sensor 30 produces therefrom a video change point sense signal 31 indicating a point where print data alters from white to black. The sense signal 31 is transmitted to the contour display controller 40 and the pattern display controller 50.

Contour data 44 created by the contour display controller 40 and pattern data 54 generated by the pattern display controller 50 are combined with each other into a modulated video signal 17 by the logical AND circuit 25 of the video data processor 20 of which the detailed structure is shown in FIG. 2. The obtained signal 17 is fed to a logical OR circuit 26 receiving the video signal 13 from the video processor 1A. As a result, there is attained a video signal 21 in which the modulation is carried out only for print data. The signal is sent to the printer engine 2.

Figure 3:
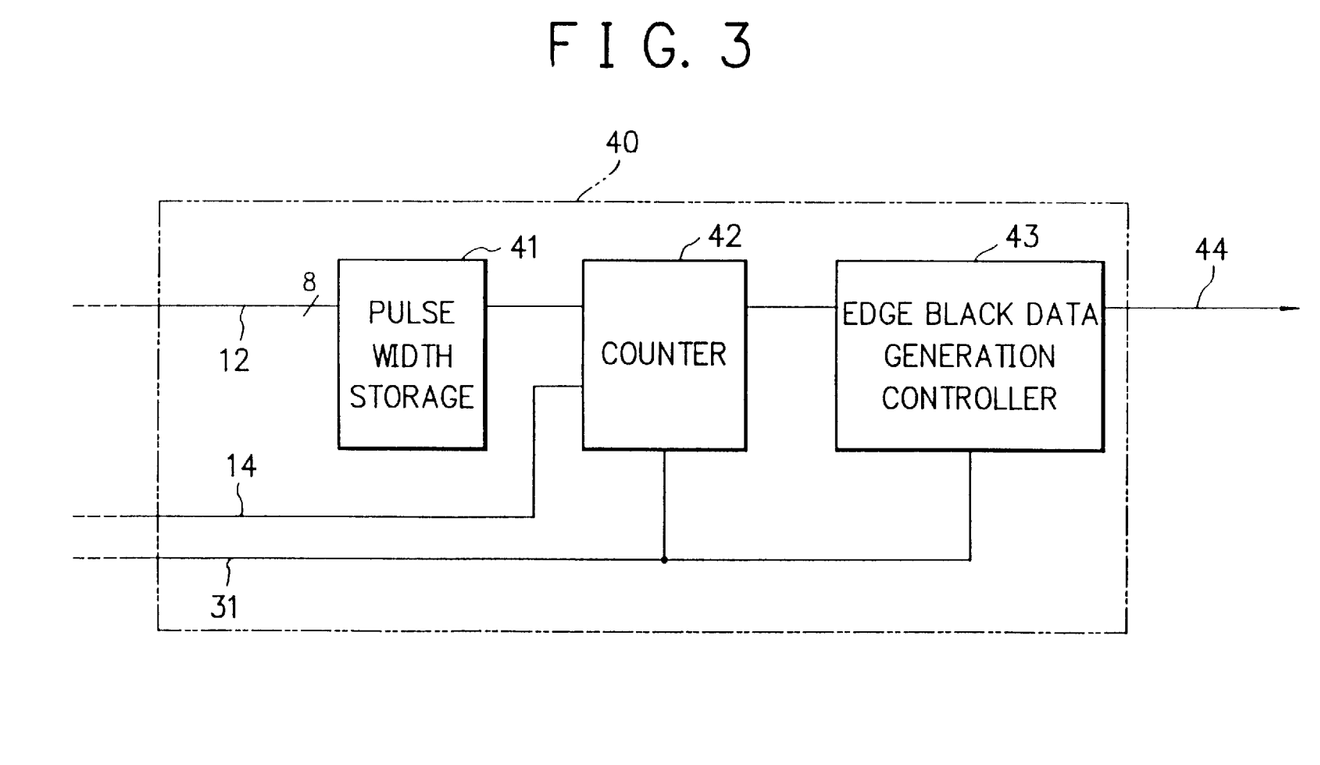
FIG. 3 is a block diagram showing an example of a contour display controller constituting the video data processor of FIG. 2.

The contour display controller 40 includes as shown in FIG. 3 a pulse width storage 41, a counter 42, and an edge black data generation controller 43. The video change point sense signal 31 described above is fed to the controller 43. In the controller 43, data representing a contour is generated using the change point as the starting point of data generation.

At the same time, the counter 42 reads information from the pulse width storage 41 and starts its count operation in synchronism with the video synchronizing signal 14. When the count operation is finished, the counter 42 sends a signal to stop transmission of black data to the edge black data generation controller 43. In response thereto, the controller 43 terminates transmitting contour data 44.

Figure 4:
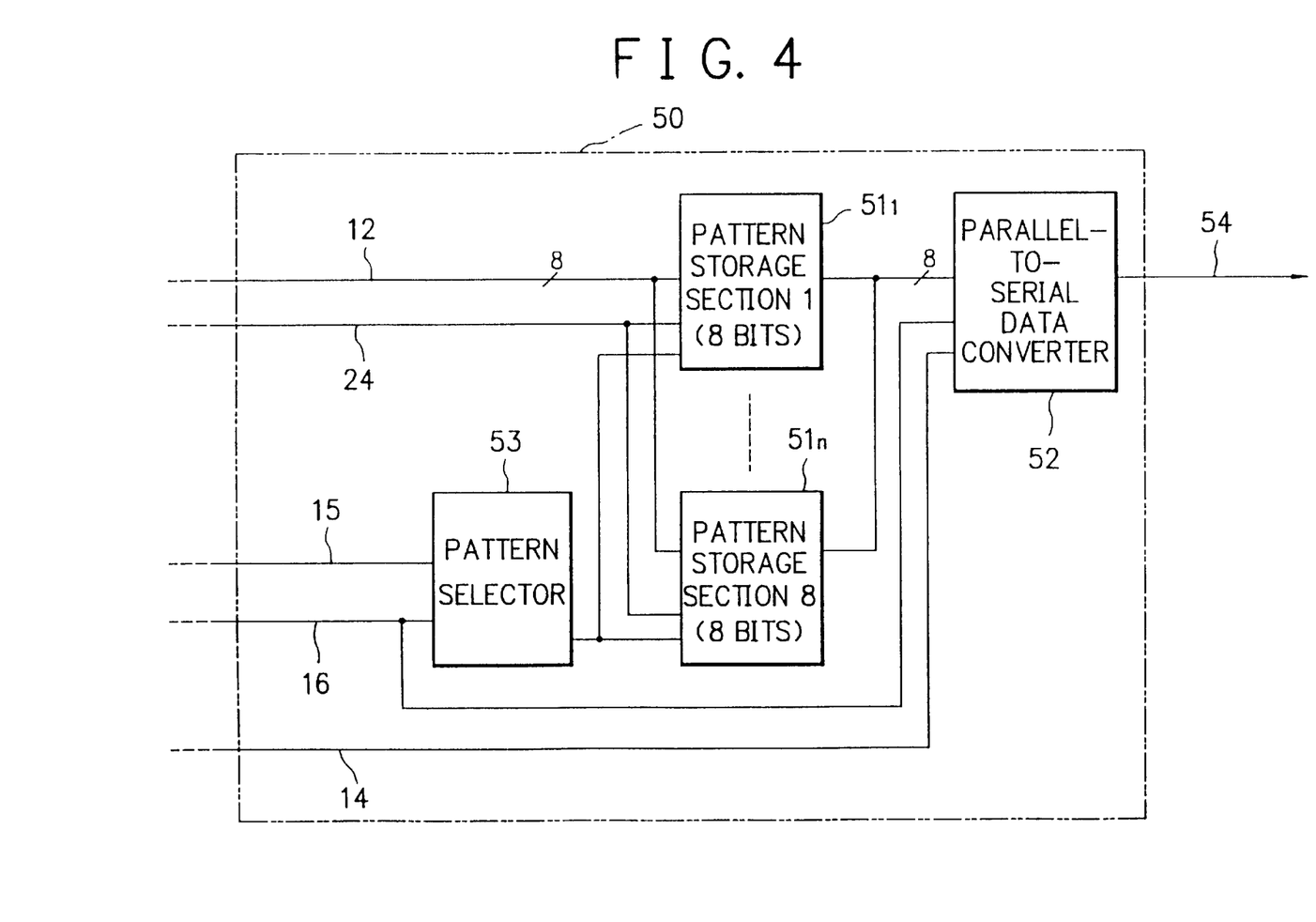
FIG. 4 is a block diagram showing an example of a pattern display controller constituting the video data processor of FIG. 2.

Referring next to FIG. 4, description will be given of the pattern display controller 50. The controller 50 includes a pattern storage 51, a parallel-to-serial data converter 52, and a pattern selector 53. The pattern storage 51 includes n storage sections 51₁ to 51ₙ. It is possible to register m-bit information to each storage section. In this embodiment, for convenience of description, there are used eight pattern storage sections each having a pattern length of eight bits.

As described above, the data bus 12 and the select signal 24 are connected to the pattern storage 51. Before the video data processing is conducted or after the printer is powered, pattern data is sequentially registered to the storage 51.

Supplied to the pattern selector 53 are the vertical synchronizing signal 15 and the horizontal synchronizing signal 16. Patterns are respectively selected from the storage sections 1 to 8 for each scan line. In this selecting operation, the sequential number of pattern selection is reset for the pattern storage 51 according to the vertical synchronizing signal 15. Thereafter, when the signal 15 is inputted, the selecting operation is carried out beginning at the first pattern again. Consequently, even when identical data is printed a plurality of times, there can be conducted the same pattern data processing.

The parallel-to-serial data converter 52 reads, on receiving the video synchronization signal 14, 8-bit parellel pattern data from the pattern storage 51 selected in the above procedure and then converts the parallel data into serial data at timing synchronized with the signal 14. For the pattern storage 51, the objective data to be stored therein is changed over in synchronism with the horizontal synchronizing signal 16. Consequently, when processing the same scanning line, pattern data selected by the pattern selector 53 is repeatedly outputted to the pattern storage 51.

Referring next to the signal timing chart of FIG. 5, operation of the video data processor 20 will be described.

Figure 5:
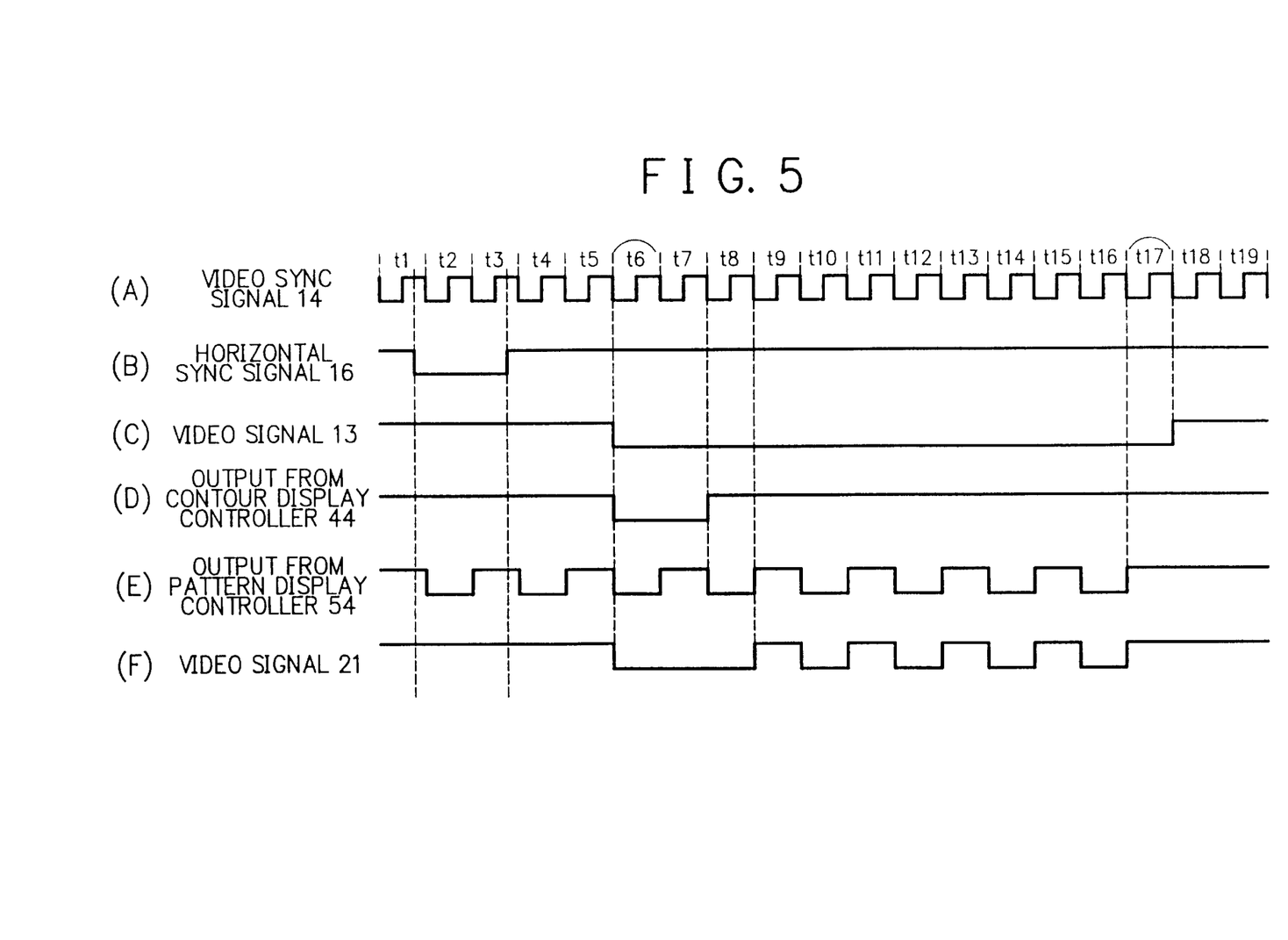
FIG. 5 is a signal timing chart showing operation of the video data processor of FIG. 2.

In the chart of FIG. 5, a video synchronizing signal 14 indicates a dot clock, a horizontal synchronizing signal 16 denotes a signal outputted from the printer engine 2, and a video signal 13 represents black print data effective at a low level. In this example, the signal 13 is valid from t6 to t17. Contour data 44, namely, a signal produced from the contour display controller 40 designates data therefrom. That is, beginning at a rising point (a falling point in FIG. 5) of the t6 state where the video signal 13 becomes effective, the value of the pulse count kept in the pulse width storage 41 is outputted therefrom. The storage 41 of the contour display controller 40 is beforehand loaded with dot width information. In this example, two-dot contour data 44 is outputted from the controller 40.

Figure 6:
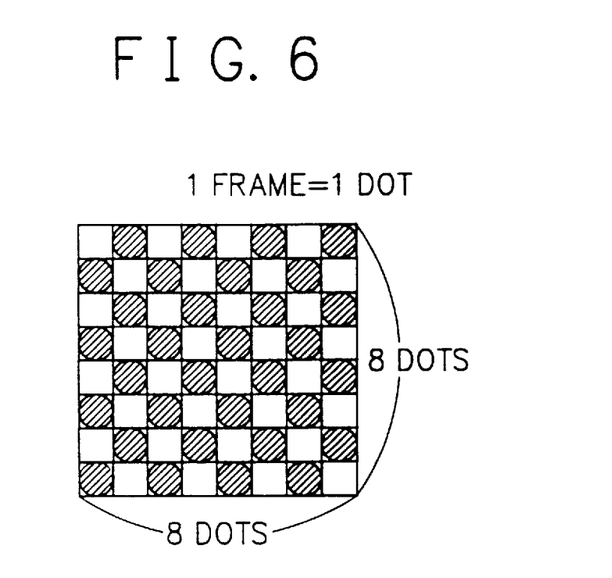
FIG. 6 is a diagram for explaining an example of pattern data in a pattern storage in the pattern display controller of FIG. 4.
Figure 7:
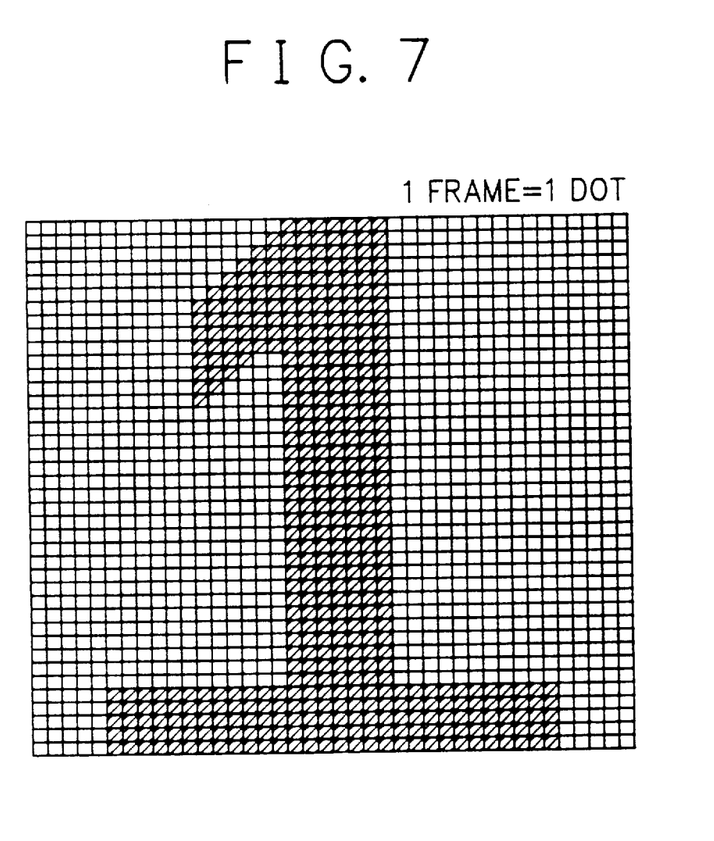
FIG. 7 is a diagram for explaining video data prior to a thinning out operation.
Figure 8:
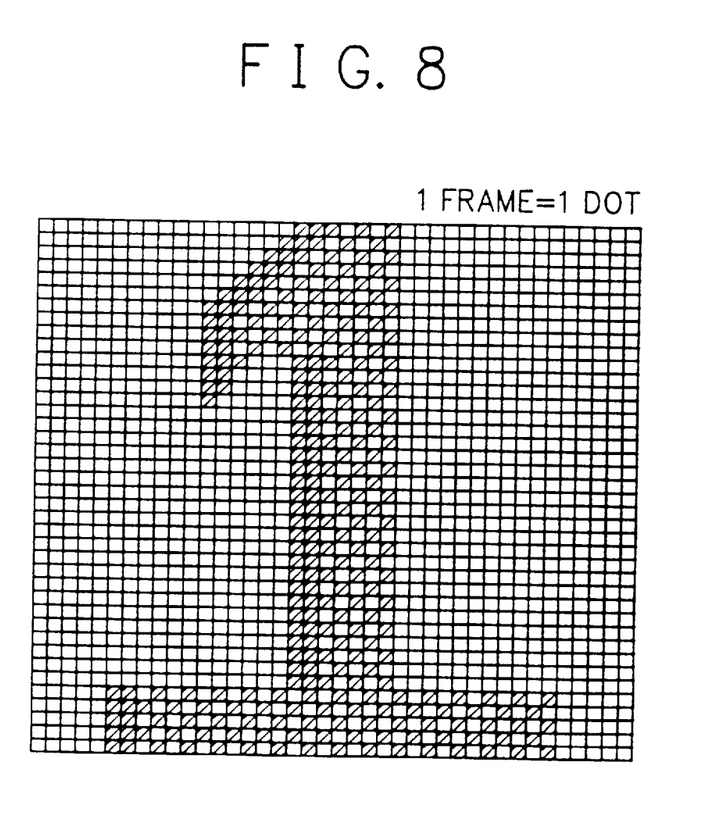
FIG. 8 is a diagram for explaining video data anterior to the thinning out operation.

Furthermore, pattern data 54, namely, a signal outputted from the pattern display controller 50 represents pattern data therefrom. In this case, a low-level signal indicates black data. In addition, a video signal 21 is delivered from the video data processor 20 to the printer engine 2. FIG. 6 shows an example of data stored in the pattern storage 51 in the form of a matrix (eight dots by eight dots). FIGS. 7 and 8 show printout examples of the data.

In the embodiment, pattern data stored in the contour display controller 40 and the pattern data display controller 50 are externally written therein via the data bus 12 according to the address bus 11. This however does not restrict the present invention. Namely, there may be employed data beforehand stored in a read-only memory (ROM), not shown, connected to the video data processor 20. This configuration leads to an advantage that the video data storage 1B need not be incorporated in the printer controller 1.

As described above, the embodiment includes the contour display controller 40 for controlling the contour display operation and the pattern display controller 50 for keeping therein the pattern data 54 in the matrix form (m dots by n dots) and controlling the output data. In consequence, as means for saving the quantity of consumed toner, consecutive dot data can be represented as a regular pattern. Moreover, depending on the manner of producing the pattern, the amount of saved toner can be remarkably increased. In addition, changing pattern data in association with resolution of the printer, a uniform printout result can be attained independently of the resolution. Furthermore, controlling the contour width, the image of original data can be kept unchanged.

Figure 9:
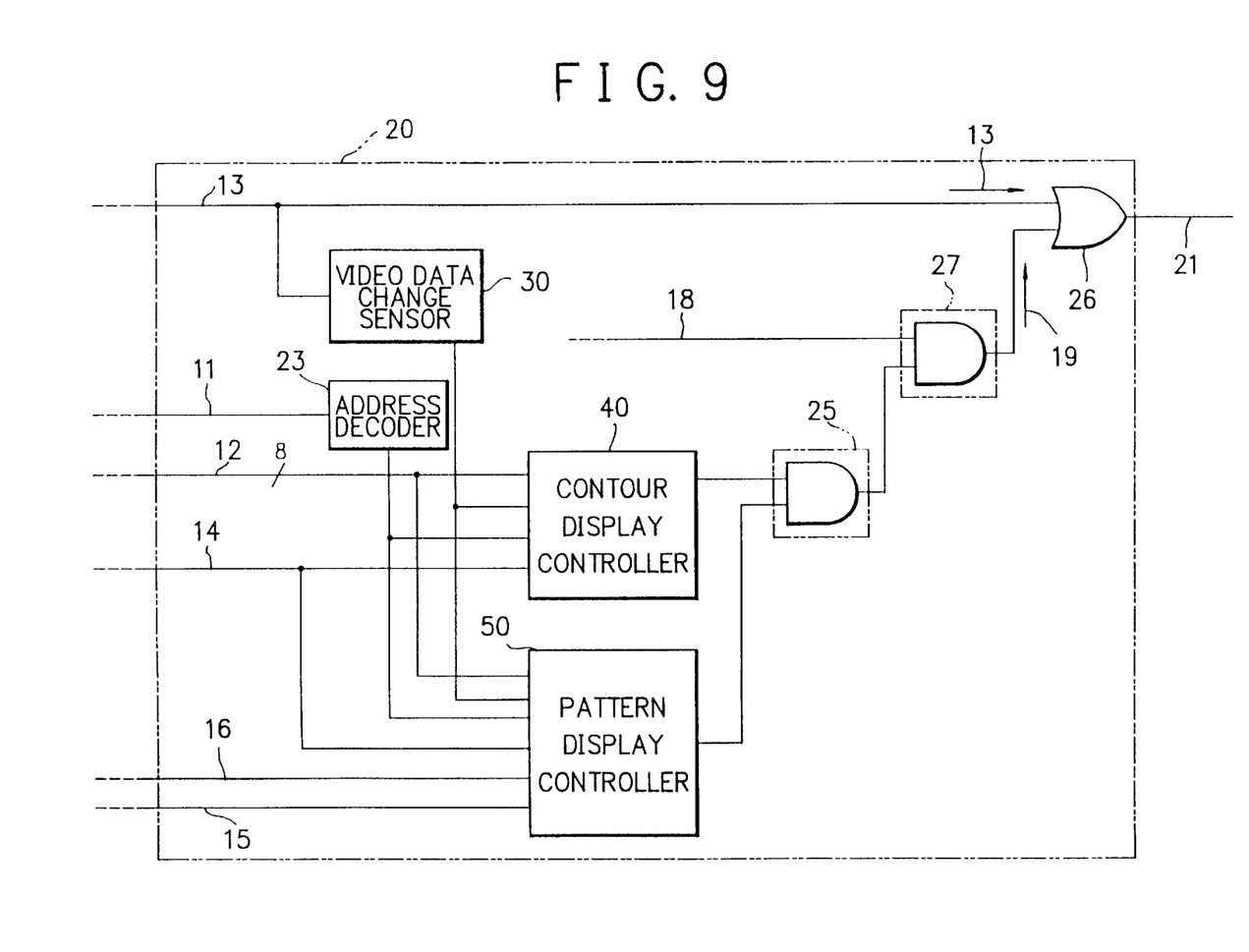
FIG. 9 is a block diagram schematically showing another example of the video data processor in accordance with the present invention.

FIG. 9 shows an alternative embodiment in accordance with the present invention. In this embodiment, in an output stage of the logic circuit 25 as the section to output the modulated signal, there is additionally disposed a logic circuit 27 operative in response to an external instruction for selecting either one of a received video signal 13 and a modulated video signal 19. Specifically, an enable signal 18 to decide whether or not the thinning out operation is conducted for the video data is fed to the logic circuit 27. The other constituent components are the same as those of the embodiment shown in FIG. 1.

With the above provision, in addition to the operation of the embodiment of FIG. 1, there is obtained an advantage of change-over operation, namely, the enable signal 18 can be set to the low level to achieve an ordinary printing operation.

In accordance with the present invention, there are disposed the contour display controller for controlling the contour display operation and the pattern display controller for beforehand keeping therein pattern data and controlling the output operation. Consequently, as means of saving the amount of toner consumption, successive dot data can be represented in the form of a regular pattern. Namely, preparing various patterns in advance, the toner consumption can be considerably saved. Furthermore, changing the pattern data depending on resolution of the printer, a uniform printout result can be attained independently of the resolution. Moreover, the image of original data can be kept remained by controlling the contour width.

On the other hand, in accordance with the present invention, in addition to the advantageous effect of operation above, the apparatus can be set to conduct an ordinary printing operation, which makes it possible to provide a printing apparatus and a printing method applicable to various purposes.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A printing apparatus including, a printer engine, a printer controller controlling said printer engine, and a video data processor, the printer engine receiving a video signal sent from said video data processor and producing a printout image thereof, said video data processor comprising:

a video data leading edge sensor receiving a video signal of characters and objects and obtaining therefrom only a leading edge of video data which alters from white to black;

a contour display controller generating data representing a contour of the video data on the basis of the obtained leading edge data and adjusting width of said contour;

a pattern display controller including a selectable pattern storage storing a plurality of display pattern data items and a pattern selector selecting a predetermined display pattern and pulse width from said selectable pattern storage; and a modulated video signal output section producing a video signal, the video signal undergoing a predetermined modulation on the basis of data outputted from said contour display controller and data outputted from said pattern display controller.

2. A printing apparatus as claimed in claim 1, further including video signal selecting means in an output stage of said modulated video signal output section for selecting either one of the received video signal and the modulated video signal and outputting the selected signal therefrom.

3. A printing apparatus as claimed in claim 1, further including a video data storage, said video data storage storing the plural display pattern data items, and said pattern storage receiving as an input thereto a predetermined display pattern data item selected from the display pattern data items stored in the video data storage and storing the received data item therein.

4. A printing apparatus as claimed in claim 3, wherein said video data storage stores therein a plurality of kinds of display pattern data items.

5. A printing method comprising:

a video data change point sensing step for receiving only a leading edge video signal and obtaining therefrom a change point of video data;

a contour display controlling step for generating data representing a contour of the video data on the basis of the obtained data change point and for adjusting width of said contour;

a pattern storing step for storing a plurality of display pattern data items;

a pattern selecting step for selecting a predetermined display pattern from the plural pattern data items; and a modulated video signal output step for producing and outputting a video signal having undergone a predetermined modulation on the basis of data outputted from the contour display controlling step and data outputted from the pattern display controlling step.

6. A printing method as claimed in claim 5, further including a video signal selecting step prior to said modulated video signal output step of selecting either one of the received video signal and the modulated video signal and outputting the selected signal therefrom.

* * * * *